Figure 1:
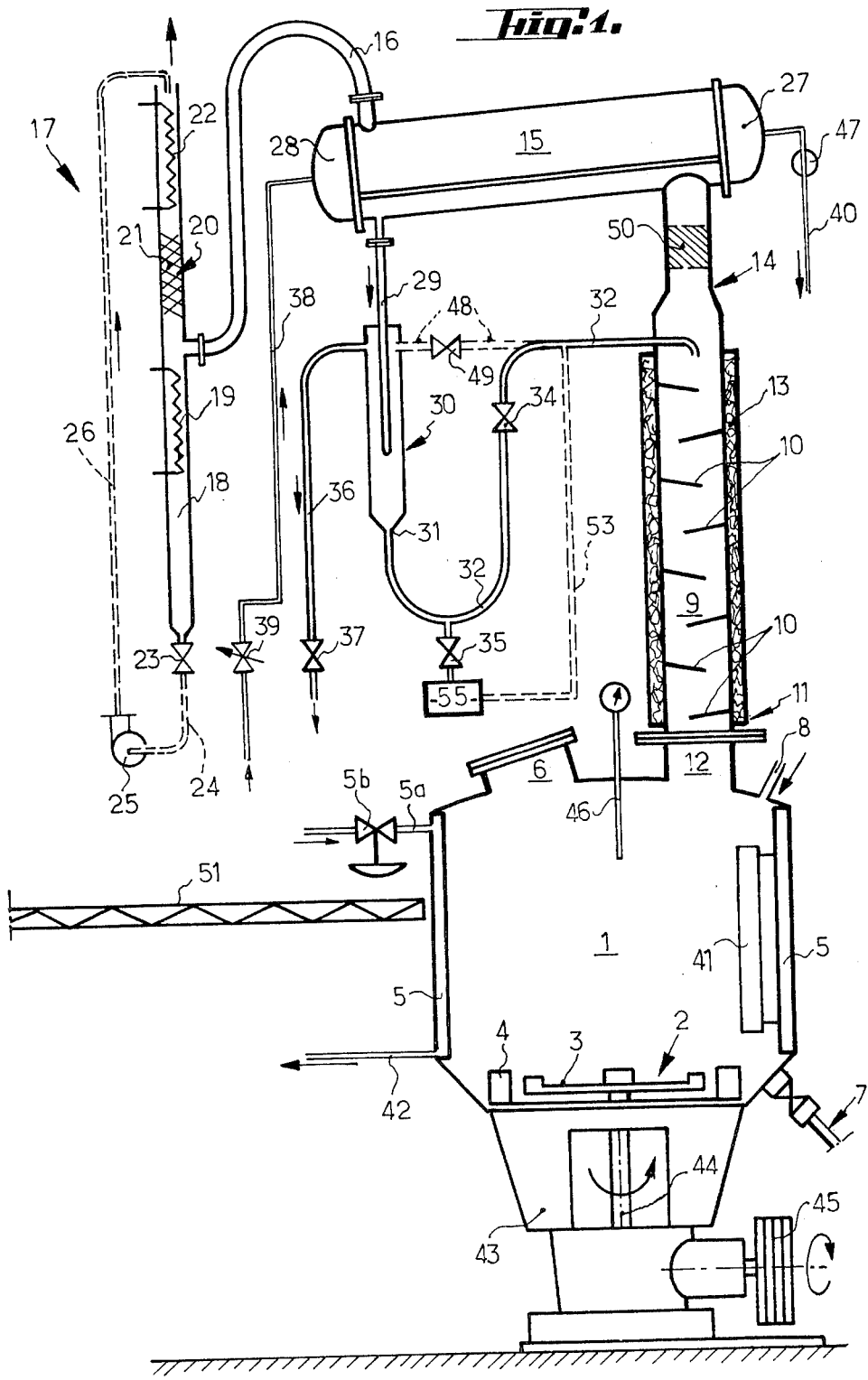

United States Patent [19]

Martel

[11] 4,257,945
[45] Mar. 24, 1981

[54] METHOD OF HIGH-SPEED IN PARTICULAR BATCH PRODUCTION OF AROMATIC ESSENTIAL OILS FROM PERFUME-GENERATING PLANTS OR FROM PARTS THEREOF SUCH FOR INSTANCE AS SEEDS, BULBS, FLOWERS AS WELL AS A DEVICE FOR CARRYING OUT THIS METHOD

[75] Inventor: Jean-Pierre Martel, Mougins, France

[73] Assignee: Agence Nationale de Valorisation de la Recherche (ANVAR), France

[21] Appl. No.: 899,511

[22] Filed: Apr. 24, 1978

[30] Foreign Application Priority Data

Apr. 27, 1977 [FR] France .............................. 77 12831

[51] Int. Cl.³ ............................................. C11B 9/00
[52] U.S. Cl. .................................. 260/236.6; 202/169
[58] Field of Search ...................................... 260/236.6

[56] References Cited

U.S. PATENT DOCUMENTS 1,211,969   1/1917   Sheehan ........................... 260/236.6

FOREIGN PATENT DOCUMENTS 2111546  5/1972  Fed. Rep. of Germany .
2422780  11/1975 Fed. Rep. of Germany .
2235190  11/1975 France ................................. 260/236.6
2276374  1/1976  France ................................. 260/236.6
 353948  10/1972 U.S.S.R. .

OTHER PUBLICATIONS

Parry, "The Chemistry of Essential Oils & Artificial Perfumes", vol. I, (1921) published by Scott et al., London (4th Ed.) pp. 415 & 416.

*Primary Examiner*—Elbert L. Roberts
*Attorney, Agent, or Firm*—Steinberg & Raskin

[57] ABSTRACT

This invention relates to a method and a device for high-speed production of aromatic essential oils from perfume-generating plants. The device comprises at least one enclosure 1 provided with means 2 for crushing said plants into a slurry, heating means 5, means 6 for feeding said plants thereto, means 7 for drawing off said slurry, a distillation column 9 and at least a condensing apparatus 15, 20 to form at least one condensate of essential oils. This device is applicable for industrially recovering essential oils from perfume-generating plants such as jasmine, orange flower, mint, ginger, aniseed, etc.

10 Claims, 2 Drawing Figures

METHOD OF HIGH-SPEED IN PARTICULAR BATCH PRODUCTION OF AROMATIC ESSENTIAL OILS FROM PERFUME-GENERATING PLANTS OR FROM PARTS THEREOF SUCH FOR INSTANCE AS SEEDS, BULBS, FLOWERS AS WELL AS A DEVICE FOR CARRYING OUT THIS METHOD

The present invention relates essentially to a method of high-speed production or expedited manufacture, in particular of the batch type, of aromatic or scented essential oils from perfume-generating plants or from component parts thereof, such for instance as seeds, bulbs, flowers as well as a device or arrangement for carrying out the method.

There is already known an arrangement for distilling essential oils from aromatic parts of plants. Such a distillation is performed in accordance with the principle of carrier steam processing.

However the distilling operation requires a relatively long time, in particular for the following reasons:

(a) the diffusion or desorption of the essential or volatile oils from their secretory cells up towards the aqueous medium is not a quick phenomenon;

(b) the separation of the essential oils from the condensed water after entrainment is based on the principle of continuous decantation. When performing decantation the so-called "florentine" decantors usually employed require moderate liquid velocities;

(c) the losses of the most volatile fractions at the condensing system should be reduced as much as possible, which may be accomplished only by operating the distillation at a reduced speed;

(d) finally, if the heat supply into the still is too great, an overheating may occur thereby inducing polymerisation or degradation phenomena as well as entrainments or carrying along of solid particles.

It results from such a requirement of conducting the operating step of extracting the essential oils from the aromatic parts of plants in a relatively slow manner or at a relatively low speed that:

(I) the essential oils or perfumes undergo for several hours the action of heat in an aqueous medium. This action of heat is longer in the case of perfumes which are more difficult to extract as is the case for instance with seeds or ligneous parts of plants with respect to petals;

(II) with this process it is only possible to recover a liposoluble fraction of the essential oils whereas substantial hydrosoluble or hydrodispersible fractions of the essential oils are lost or reprocessed in case of a reflux within the still;

(III) non-condensable vapors are generally rejected to the atmosphere which may raise an issue of nuisance;

(IV) the operating cycles are long. In order to minimize in particular the time wasted by loading and unloading, there is a trend to the building of big distilling boilers. Now it is known that when the size of a boiler increases, the ratio of its surface being heated by steam within the double-walled shell or casing, to its useful volume, becomes more and more unfavorable. It is then necessary to increase the working pressure of the steam within the double-walled shell or casing and accordingly its temperature.

Until now some approaches have been suggested with a view to overcoming the aforesaid drawbacks. It has in particular been tried to inject vapor or steam directly into the still. Such an approach however is likely to "destroy" the essential oils or perfumes of the plants to be distilled in particular through degradation on account of the temperature being too high within the still. Moreover this method requires the use of a vapor devoid of extraneous smells likely to interfere with the aromatic essential oils from said plants. Also a relatively substantial fraction of the vapor or steam used for carrying along or entraining the essential oils would condense within the still due to this process thereby leading to an excess of condensate obtained and preventing any reprocessing or recycling of the decanted waters.

Another approach consists in a distilling under pressure. When indeed the pressure prevailing within the still is increased, the vapors which would evolve therefrom are enriched with entrainable principles, constituents or ingredients (essential oils) because the vapor tension of the essential oils increases faster than the vapor tension of the water when pressure increases. It results therefrom that the duration of distillation of a given amount of essential oils is reduced. However, as the distillation is effected under pressure, the boiling temperature of the solution is higher and accordingly the aforesaid result is nearly always achieved at the cost of the quality of the product since effects of polymerisation or thermal degradations are noticed above 100° C. Furthermore, distortions will occur in the composition of the distillate such for instance as a relative enrichment with sesquiterpenes which are undesirable compounds.

The object of the invention is therefore to remove the aforesaid inconveniences.

Thus an object of the invention is to provide a method of dynamic distilling allowing an acceleration of the extraction of the essential oils from perfume-generating plants or from parts thereof such for instance as seeds, bulbs, flowers and so on preferably together with a simultaneous rectification of the vapors produced and an entrapping of the volatile and uncondensable fractions of the essential oils.

The approach according to the invention consists in a method of high-speed production or expedited manufacture, in particular of the batch type, of aromatic essential oils from perfume-generating plants or from parts thereof such for instance as seeds, bulbs, flowers, said method being characterized by the steps of effecting a crushing of said plants in bulk, this crushing resulting in a division of the plants into fine particles through dilaceration, fiber removal by grinding, disintegration or shredding or breaking up or splitting up of all the parts of said plants and converting said plants into a slurry and at the same time during that crushing carrying out a heating of the slurry as it is being formed, the temperature being controlled so as to achieve the production of vapors with a high content in essential oils from said plants, and rectifying said vapors in order to obtain vapors with the maximum richness in essential oils and then condensing said enriched vapors as a condensate of essential oils which is recovered.

Preferably, before performing said crushing, a partial or preliminary crushing of the plants is carried out upon said loading when the volume of the plants put in bulk is too large. It is advantageous that prior to said crushing, the plants in bulk be loaded into an extraction medium or agent.

Also preferably, once the conversion of the plants into a slurry has been completed, the heating, carried out during the crushing, is continued under steady stirring (trituration) whereas this heating is advantageously carried out during and after the crushing through heat exchange with a heating fluid or medium.

Thus the method according to the invention enables a plant to be exhausted or depleted of its essential oils in a time three to five times shorter than with the old static process. Therefore, the duration of contact of the volatile oils with the extracting agent and the vapors at the boiling temperature is substantially reduced and their quality is accordingly sharply improved because no decomposition or polymerisation of said essential oils occurs.

Moreover, this method permits recovery not only of the decantable fraction of the essential oils which is insoluble in the extracting agent, but also and at the same time of a fraction soluble in the extracting agent at a high concentration, in particular owing to the aforesaid rectifying step. This fraction which is soluble in the extracting agent may be as large as the fraction which is not soluble from a quantitative standpoint. Preferably the extracting agent is water and with the method it is possible to recover the liposoluble and hydrosoluble fractions of the essential oils. For instance, the hydrosoluble fraction of the essential oils of rosemary is as large as the liposoluble fraction. This is a very significant advantage of the method according to the invention.

Further, the method according to the invention offers the advantage of being applicable to the extraction of the essential oils from very perishable raw materials (such for instance as jasmine) which heretofore could be processed only through extraction with solvents. With the method it is also possible to obtain essential oils from raw materials in which the essential oil content is so low that the essential oils may not be recovered with conventional processes; this is for instance the case of coffee, tea, vanilla.

Another object of the invention is an arrangement or device for carrying out the aforesaid method, which is characterized in that it comprises at least one enclosure provided with means for crushing said plants into a slurry, means for regulating the temperature prevailing within said enclosure, supply means for feeding said plants thereto, means for drawing off the slurry, a distillation column or tower comprising in particular inclined baffle plates forming trays, which is connected to each aforesaid enclosure, so as to collect or gather the vapors evolving from said slurry, and at least one apparatus for condensing the vapors issuing from the head of said column so as to form at least one condensate of essential oils.

The invention is also directed to the new industrial product consisting of more or less detergenced essential oils and of the aqueous aromatic substances at a high concentration obtained with the aforesaid method.

Figure 2:
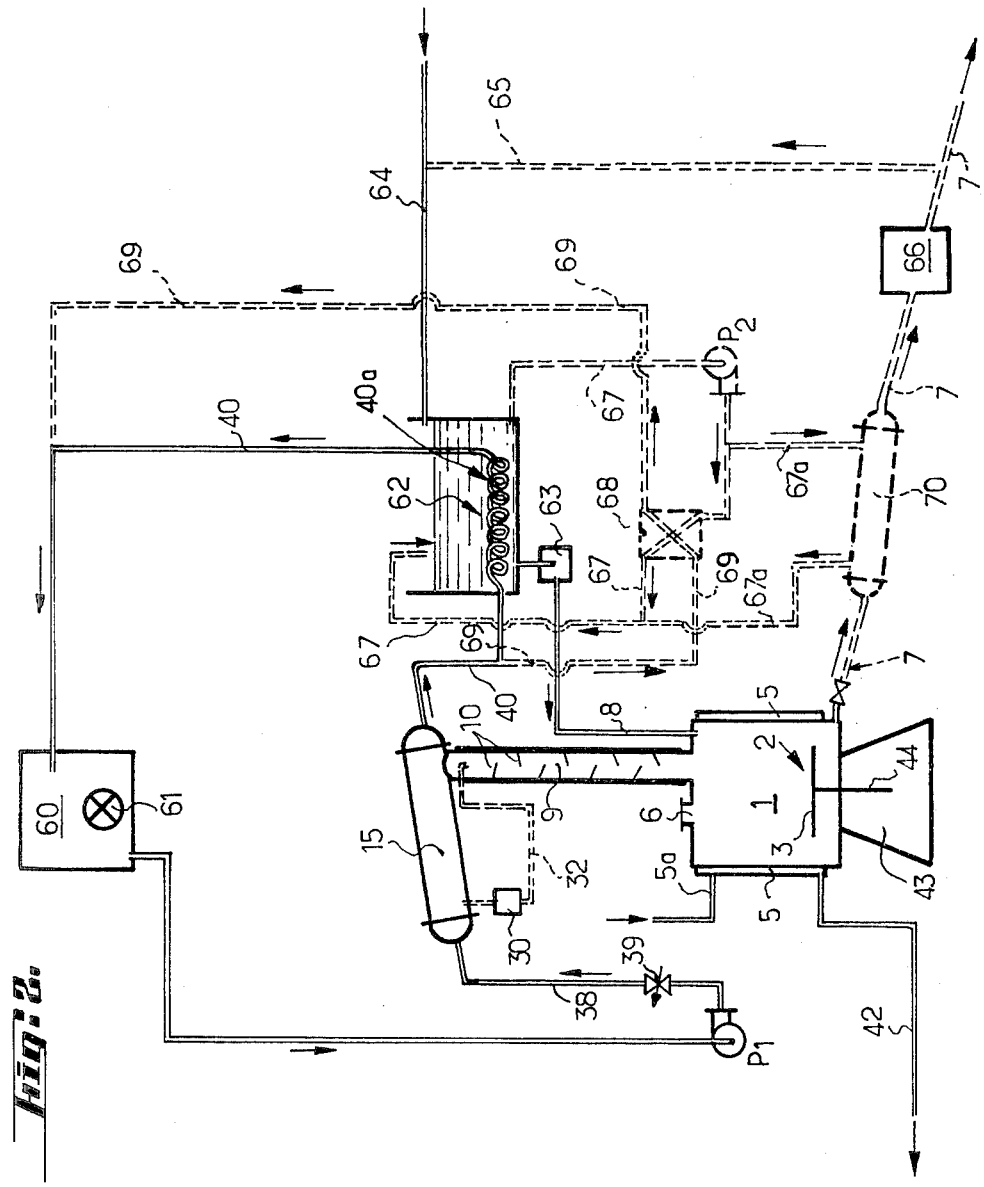

Further objects, advantages and characterizing features of the present invention will appear more clearly when reading the following detailed explanatory description with reference to the accompanying diagrammatic drawings given by way of non-limiting example only and illustrating a presently preferred specific embodiment of the invention. In the drawings:

FIG. 1 diagrammatically shows an embodiment of an arrangement according to the invention; and FIG. 2 more particularly shows the circuits followed by the extracting agent and by the cooling medium with a view to making substantial savings in the power consumed by said arrangement.

Referring to FIG. 1, an arrangement according to the invention essentially comprises at least one enclosure or vessel 1 provided with crushing means 2 such as a turbo-defibrator or turbo-shredder or turbo-disintegrator or turbo-comminutor or grinder comprising a rotor 3 for instance with discs or blade-knives and a stator 4 which is or not made fast or rigidly connected with the enclosure of casing 1. The stator 4 advantageously comprises blades and in particular swivelling blades. The enclosure 1 advantageously also comprises means 5 for heating the contents thereof, such as a double envelope, jacket or shell, a duct 5a and a feed valve 5b for supplying a heating medium or fluid such as steam into the jacket with a view to regulating the temperature within the enclosure 1, means 6 for feeding plants into the enclosure, means 7 for drawing off the slurry. The enclosure 1 may also advantageously comprise means 8 for feeding an extracting agent. Preferably the heating jacket 5 providing for the regulation of the temperature within the enclosure 1 surround the area where the slurry of crushed plants is being formed.

The arrangement also comprises a distillation column 9 which is preferably provided with sloping baffle plates forming trays and advantageously has a cross-section of a large size and is connected at its bottom 11 to a co-operating opening 12 of the enclosure or casing 1 so as to collect the vapors evolving from the slurry. Preferably the column 9 is provided with a heat insulation 13. The top 14 of the column 9 communicates with a main apparatus 15 for condensing the vapors flowing out of the column head. This condensing apparatus 15 is connected through a pipe-line 16 to a secondary or auxiliary apparatus 17 for condensing the non condensed vapors issuing from the main condenser 15. The lower part 18 of the apparatus 17 serves as a receiver or collector and as a settler or like apparatus for decanting the condensed volatile essential oils through the agency of a cooler 19, of a condensation and scrubbing or washing column or tower 20 provided preferably with a packing or the like 21, of an aftercooler 22 preferably of the reflux type. This apparatus 17 also comprises at its lower portion 18 a drain-cock 23 for discharge and phase separation through a pipe-line 24 which communicates possibly with a recycling pump 25 for recirculating the condensation and scrubbing liquid for washing the uncondensable substances on the column 20 through the agency of a reflux duct 26.

The main condensing apparatus 15 is preferably arranged with a small slope or pitch and has its end portion 27 which communicates with the distillation column 9, located on a level higher than the level of the other or opposite end portion 28 of the apparatus 15. The apparatus 15 is fitted at the lower part of the end portion 28 with a condensate feedback pipe-line 29 which communicates with a continuous decanting apparatus or settler 30 sealed against air. This settler or decanting device 30 is provided at its bottom part with an outlet 31 which may be connected through a duct 32 and a valve 34 to the top 14 of the column 9. This duct 32 also comprises a draw-off tap or cock 35. The settler 30 includes at its upper part a pipe-line 36 provided with a valve 37 for drawing off the upper phase separated in the settler or decanting device 30.

The settler or decanting device 30 may also be connected at its upper portion through a duct 48 fitted with a valve 49 to the duct 32 downstream of the valve 34.

The condensing apparatus 15 comprises a coolant supply pipe-line 38 provided with a control valve 39 for adjusting the feed or supply flow rate and an outflow or output pipe-line 40 for the heated coolant or cooling medium issuing from the apparatus 15. Preferably the condensing apparatus 15 is of the tubular type but it may exceptionally be a plate condenser or the like in big industrial plants.

Preferably the enclosure or casing 1 is provided with an anti-vortex deflector or like baffle 41 which is stationary or preferably adjustable, i.e. swivelling. The temperature-regulating or controlling means 5 comprise a duct 42 for draining or discharging the vapor condensates.

The base portion 43 of the turbo-defibrator or turbo-shredder 2 includes a fluid-tight sealing device for the shaft 44 driving the rotor member 3. The driving of the shaft 44 is preferably provided through a mechanical drive member 45 the speed of which is adjustable owing to the use of a speed variator or to the use of pulleys or sheaves.

It is also possible to provide a temperature-sensing or detecting apparatus 46 within the enclosure 1 and a temperature-sensing or detecting apparatus 47 within the pipe-line 40, said apparatus preferably consisting of thermocouples. The top section 14 of the column 9 is preferably provided with a filter or devesiculator 50 preventing solid particles from being carried along or entrained from the enclosure 1.

It is also possible to provide a platform 51 for enabling an operator to obtain access to the system. An apparatus 55 for physically treating or processing the extracting agent may be located downstream of the cock or tap 35 and may then be connected to the duct 32 through a pipe-line 53.

Preferably with reference to FIG. 2, the system comprises flow circuits for the extracting agent and the coolant to thereby achieve savings in power. In particular, the circuit for the cooling fluid (which preferably is water) comprises an atmospheric cooling tower 60 providing a storage or supply of coolant which flows along a closed loop or circuit through the agency in particular of a pump $P_1$ connected in the pipe-lines 38 and 40. There is also provided a blower or fan system 61.

The flow circuit for the extracting agent comprises a supply tank, jar or like container 62 through which extends the pipe-line 40 preferably comprising a tubular coil 40a. The tank 62 communicates through input or feed means 8 provided with a volumetric counter or positive-displacement meter 63 within the casing 1. This flow circuit also comprises a supply pipe-line 64 for replenishing or refilling the tank 62 with extracting agent and which is possibly connected through a duct 65 with the draw-off means 7 in order to recover the extracting agent and which is separated by at least one physical treatment apparatus 66 from the slurry issuing from the enclosure 1. The circuit for the extracting agent moreover comprises on the one hand a pipe-line 67 arranged in a loop about the tank 62 and which is connected to the passage-way for the cooling medium of a heat exchanger 68 whereas the coolant flows through the passage-way for the heating medium of that heat exchanger 68 passing through a pipe-line 69 connected to the duct 40 and on the other hand the pipe-line 67 comprises a branch pipe 67a communicating with the passage-way for the cooling medium of a second heat exchanger 70 through the passage-way for the heating medium of which the slurry drawn off the enclosure 1 through the draw-off means 7 flows.

It should be pointed out that the heat exchangers 68 and 70 are of any construction known per se and are for instance of the tubular or plate type. The heat exchange between the cooling medium and the heating medium within the heat exchangers 68 and 70 is effected in counterflow or counter-current relationship so as to provide a methodic and dynamic heat exchange.

The operation of the system described hereinabove is as follows with reference to FIGS. 1 and 2:

an amount of extracting agent which is for instance water and which is predetermined or previously set by the counter or meter 63 is fed from the tank 62 into the casing 1. Then plants are loaded in bulk into the casing 1 through the feed or input means 6. No extracting agent may be fed into the casing 1 when the plants loaded into the casing 1 are likely, upon being crushed, to release a certain amount of water which then forms the extracting agent. Also when the volume of the plants put in bulk into the enclosure 1 is too large, a partial crushing of the plants is performed when loading them.

When feeding in an extracting agent such as pure water without any extraneous scent, the volume of extracting agent to be supplied depends upon the treated plant. This volume is determined through preliminary tests which have given the highest plant/extracting agent weight ratio consistent with a fluidity of the final slurry adequate for discharge through the draw-off means 7. As a general rule, the plant-to-extracting agent weight ratio ranges from 0.2 to 1.

After closing off the feed or input means 6 the rotor 3 of the turbo-shredder or defibrator 2 is set into motion or started thereby effecting a wet crushing of the plants put in bulk so that the plants are converted into a slurry. This crushing causes the plants to be divided into fine particles through dilaceration, defibration, disintegration, shredding or breaking of all the parts of the plants loaded in their picked up condition. The term "parts of the plants" is meant to include for instance the seeds, the bulbs, the flowers and so on, i.e. all the parts of the plants which are likely to yield aromatic or scenting essential oils. The revolving blade or paddle rotor 3 also initiates a strong stirring of the slurry thereby further facilitating the exchanges between solid and liquid phases and further accelerating the release of essential oils from the plants or of the volatile oils into the extracting agent.

While carrying out the crushing step, the slurry is simultaneously heated as it is being formed, at a controlled temperature so as to produce vapors with a high content in essential oils from the plants by feeding steam through the pipe-line 5a into the heating jacket 5 of the enclosure or casing 1. The coefficient of heat exchange or transfer at the walls of the jacket 5 is outstanding in view of the turbulence or swirl induced by the rotor 3. This results in the obtainment of a high plant-to-extracting agent weight ratio and also avoid the removal of local overheatings and preferential paths of travel (also owing to the anti-vortex deflector or baffle 41).

Very quickly, vapors will evolve from the slurry and such vapors are rectified by flowing through the column 9 which has a cross-section of adequate size for limiting the flow velocity of the vapors within the column 9 and avoiding to the largest extent any entrainment of the solid particles of the plants. Moreover, as the baffle plates 10 are inclined, they are washed by the reflux liquid thereby compelling the vapors to change their direction of flow and promoting stopping of the particles carried along. This also enables high vapor flow rates to be achieved. As an advantage it should be noted that the aforesaid heating accomplished during the crushing step is continued under strong stirring action promoting the obtainment of a good trituration of the slurry, once the conversion of the plants into a slurry has been accomplished. Likewise the heating performed during and after the crushing step is advantageously effected through heat exchange with a heating fluid, in particular with steam flowing within the double shell or envelope 5 of the enclosure 1.

The vapors then arrive at the top 14 of the column 9 where the solid materials which they have possibly carried along are removed therefrom by means of the devesiculator 50 and the vapors then flow through the main condensing apparatus 15 where a fraction of the essential oils in admixture with the extracting agent will condense through heat exchange with a cooling medium which preferably is water flowing in a closed loop or circuit in counter-current relationship through the pipe-lines 38 and 40. The essential oils condensed in admixture with the extracting agent form a condensate. This condensate is subjected to any physical treatment capable of separating all the essential oils from the extracting agent, i.e. capable of separating at the same time the essential oils which are insoluble in the extracting agent and the essential oils which are soluble in the extracting agent.

In order to do that, the condensate flows through the pipe-line 29 into the settler or decanting apparatus 30 and the essential oils which are insoluble in the extracting agent will separate from the latter while forming two non-miscible phases. If the insoluble essential oils have a specific gravity or density lower than the specific gravity or density of the extracting agent, the phase of the essential oils lies above the phase of the extracting agent and said essential oils are recovered or collected through the duct 36. Preferably the phase of the extracting agent which contains those fractions of the essential oils which are soluble in said agent is drawn off through the cock 35 and subjected for instance to an extraction by means of a solvent or to any similar operating step well known in the art permitting separation of those fractions of the essential oils which are soluble in the extracting agent from the latter (at 55). A predetermined adjustable fraction of the extracting agent is then preferably recycled in the column 9 either through the pipe-line 53 when the fraction is devoid of any essential oils or through the duct 32 when it still contains said oils.

Conversely, if the essential oils have a specific gravity or density higher than the specific gravity or density of the extracting agent, the essential oils are collected or recovered through the cock or tap 35 whereas a fraction of the extracting agent which is also separated from the soluble fractions of the essential oils is recycled in the column 9. The fraction of vapor which is not condensed within the condensing apparatus 15 passes through the duct 16 into the secondary condensing apparatus 17 where it is condensed as a second condensate. With the apparatus 17, it is possible to recover or collect the light uncondensable fractions of the essential oils which have settled in the lower section 18 of the apparatus 17 and which are recovered or collected through the cock 23.

It should be noted that on the one hand, the proportion in weight of the first condensate (which is collected in the settler or decanting apparatus 30) to the second condensate and on the other hand, the reflux temperature of the extracting agent are adjusted through variation of the flow rate of the cooling fluid of the apparatus 15 by means of the valve 39. Through the control or monitoring of the reflux temperature, it is possible to optimize the settling or decanting operation because the light oils separate better in hot or warm condition from the extracting agent and a hot or warm reflux promotes the normal working of the column.

As soon as it is observed that no more essential oils are separating from the extracting agent within the settler or decanting apparatus 30, the feed of steam into the heating jacket 5 is discontinued by closing the valve 5b and the slurry remaining in the enclosure or casing 1 is then discharged through the draw-off means 7 whereas the rotor 3 is still rotating thereby facilitating the expelling of the slurry from the enclosure 1.

Preferably, with reference to FIG. 2, in order to decrease the consumption of power required for carrying out each operating cycle after having fed the required volume of extracting agent into the enclosure 1, an equivalent volume of extracting agent is fed into the tank 62. It is thus possible to preheat this extracting agent through heat exchange of the latter with the cooling medium which has flowed through the condensing apparatus 15 by means in particular of the heat exchanger 68 and of the pipe-line 40 including the coil 40a which extends through the solution of extracting agent contained in the tank 62. It is also possible to preheat the extracting agent by recovering the heat from the hot slurry remaining at the end of the cycle through heat exchange in the heat exchanger 70.

Preferably, the slurry remaining at the end of the operating sequence undergoes any physical treatment in particular in the physical treatment apparatus 66 which is capable of separating any non-volatilized essential oils and/or the fatty oils contained in the slurry. This physical treatment apparatus 66 in particular comprises a filtering device, a settling or decanting device, a device for extracting by means of a solvent. The extracting agent separated from the non-volatilized essential oils may then be fed again back into the tank 62 through the pipe-line 65 whereas the residual "marc" may be used as a fuel.

It should be pointed out that the extracting agent may be water, a volatile organic solvent, in particular alcohol, or mixtures thereof. The cooling fluid preferably is water to which an anti-freezing agent may possibly be added for limiting the losses through evaporation. Moreover the steam which serves to heat the enclosure 1 preferably flows in a closed loop or circuit comprising a boiler.

It should further be noted that a part of the mechanical energy consumed during the operation of the rotor 3 of the turbo-defibrator 2 is converted into thermal energy whereby the supply of heat required for heating the slurry may further be decreased.

All the perfume-generating plants are usable with the method according to the invention. Thus may be cited for instance: jasmine, orange flower or blossom and all flowers with tender petals; rosemary, mint, ginger, mace, allium or garlic, aniseed etc. Most of these plants are loaded with an extracting agent such as water, with a plants/extracting agent ratio ranging from 0.2 to 1 and preferably from 0.2 to 0.4; this is the case with allium or garlic and anise. As to those plants which are rich in water (for instance onion) they are crushed without any addition of extracting agent such as water.

It should be noted that in some cases the slurry is subjected prior to the aforesaid rectifying stage to an enzymatic treatment. This is the case in particular of plants on which an enzymatic action allows the development or even the generation of perfume. This is for instance the case of allium or garlic which requires an enzymatic action for promoting the development or the extraction of the essential oils which are desired to be obtained. The crushing means also accelerates the enzymatic actions through division and turbulence. The best temperature for performing such an enzymatic treatment is easily obtained with the temperature-regulating or controlling means 5. The enzymatic action is completed by raising the temperature in order to pass to the rectifying stage which simultaneously results in the enzymatic inactivation.

As previously mentioned, the invention is applicable to raw materials wherein the content in essential oils is so low that they are not recoverable through conventional processes; this is for instance the case with coffee, tea, vanilla and even in the case of a lack of separable essential oils, a condensate rich in hydrosoluble or hydrodispersible essential oils is recovered according to the invention.

To show the superiority of the method according to the invention with respect to the prior art method, the following practical example is given:

a vessel with a capacity of 1,000 liters is used and 800 liters of water and 300 kg of non crushed dry green aniseed are loaded therein. The crushing means 2 have a rated power of 20 ch. The preheating of the solution is effected in 30 minutes with a corresponding rise of temperature from 20° C. to 102° C. (the boiling temperature is slightly above 100° C. since the pressure is slightly above atmospheric pressure in view of the head or pressure loss in the distilling circuit). The steam pressure in the heating jacket is 2 bars and the consumption required for the preheating is about 150 kg. The average steam flow rate is 300 kg/h. For the distilling operation, the heating steam flow rate is of 200 kg/h and the vaporization capacity is about 200 kg/h because said conversion of mechanical energy into thermal energy compensates for the various losses.

Anise oils recovered (as soon as the temperature of the slurry is 102° C.):

| 1st hour: | 4 kg |
| 2nd hour: | 2.5 kg |
| 3rd hour: | 1.5 kg |
| 4th hour: | 1.0 kg |
| Total amount: | 9.0 kg in 4 hours. |

The yield of aniseed therefore is 3%, the hourly mean distilling speed is 2.25 kg/h whereas the mean speed over the full cycle of 5 hours which comprises the loading, preheating and unloading operating steps is 1.80 kg/h.

The heating steam consumption per kilogram of oil produced is 90 kg whereas the overall steam consumption for the preheating step when the heat recovery system is missing is 105 kg. The cooling water consumption is 3 m³/h.

According to a conventional method such a recovery of the essential oils from anise would have lasted about 16 hours. Thus the duration of the essential oil recovery operation is four times shorter according to the invention than with the prior art methods thereby resulting in an improvement of the quality of the essential oils and accordingly of the scents and perfumes obtained. Also as previously mentioned, the liposoluble and hydrosoluble fractions of the plants are obtained with the invention which constitutes a very significant advantage.

It should further be noted that the effects of dilaceration during the crushing of the plants may be limited by reducing the peripheral velocity of the rotor 3 or by increasing the spacing between rotor and stator whereby it is possible to avoid the extraction of undesirable substances (for instance of the ligneous parts or pips).

It should be understood that the invention is not at all limited to the embodiment described and shown which has been given by way of example only. In particular it comprises all the means constituting technical equivalents of the means described as well as their combinations if same are carried out according to its gist and within the scope of the appended claims.

What is claimed is:

1. Method for the high-speed production of aromatic essential oils from perfume-generating plants or parts thereof, which comprises simultaneously crushing said plants or parts thereof into fine particles and forming therefrom an aqueous slurry while still further simultaneously heating said slurry as it is being formed to a temperature sufficiently high to form water vapors with a high content in essential oils from said plants, subjecting the thus formed vapors to fractional rectification under substantially atmospheric pressure while preventing passage of solid particles, thereby concentrating the content of the essential oils therein to form enriched vapors, condensing said enriched vapors, thereby forming a condensate, recovering said condensate, removing the essential oils from said condensate, and recycling a portion of the remaining condensate free of essential oils to the retification step.

2. Method according to claim 1, wherein before said crushing step the plants are mixed with water.

3. Method according to claim 2, wherein the plants to water weight ratio ranges from 0.2 to 1.

4. Method according to claim 2, wherein the water is preheated prior to crushing by means of heat exchange with a heating medium.

5. Method according to calim 1, wherein the heating of the slurry is effected through heat exchange with a heating fluid.

6. Method according to claim 1, and further comprising the steps of effecting a partial condensing of the enriched vapors thereby obtaining a first condensate and effecting a final condensing of the non-condensed enriched vapors following said partial condensing thereby obtaining a second condensate, said condensations being carried out through heat exchange with a cooling medium.

7. Method according to claim 6, wherein the water is added to the plants prior to crushing thereof, and the cooling medium used is recycled for heating the water.

8. Method according to claim 1, wherein the slurry remaining at the end of the cycle is subjected to a physical treatment to separate any non-volatilized essential oils and fatty oils contained in the slurry.

9. Method according to claim 1, wherein vigorous stirring of the slurry is effected during the crushing operation to promote good trituration.

10. Method according to claim 1 wherein the rectification is performed with a recitfying column having a cross section adapted to limit the velocity of the vapors entering therein, thus avoiding entrainment of solid plant particles from the slurry.

* * * * *